Patented Jan. 25, 1944

2,339,788

UNITED STATES PATENT OFFICE 2,339,788

SUBSTITUTED PARA-AMINOBENZENE SULPHONAMIDE COMPOUND

John Lee, Clifton, N. J., assignor to Hoffmann-La Roche, Inc., Nutley, N. J., a corporation of New Jersey No Drawing. Application December 11, 1936, Serial No. 115,343

3 Claims. (Cl. 260—239.6)

The present invention has for its object the provision of substituted para-aminobenzene compounds having properties rendering them suitable for use in animal therapy, especially of compounds adapted for use as general internal antiseptics against bacterial infections in the higher animal organisms, and more particularly of compounds which are non-toxic to human beings and are highly effective against streptococci.

The present application is a continuation in part of my copending application Serial No. 80,138, filed May 16, 1936.

I have found that by combining compounds of the para-aminobenzenesulphonamide type, that is, para-aminobenzenesulphonamide and certain of its substitution products, with formaldehyde sodium bisulphite (or other metal compound of this type), therapeutically valuable substances are obtained which act as efficient internal antiseptics in the treatment of such diseases as scarlet fever, puerperal fever, erysipelas, pus infections, infections of the genito-urinary tract, and coccus infections generally. The compounds are neutral, non-irritating, and practically non-toxic and can be used in relatively large doses without ill effects.

The compounds produced by me have the general formula

wherein R' may be either hydrogen or a saturated or unsaturated hydrocarbon radical, such as alkyl, (alkane) alkenyl or aralkyl; $R^2$ is hydrogen, alkyl (alkane) or alkenyl; R' and $R^2$ together form an alkylene group; and $R^3$ is hydrogen or an alkyl group.

The invention will be further described in the following examples which are presented by way of illustration only and not as indicating the limits of the invention:

Example 1

172 parts of para-aminobenzenesulphonamide are mixed with 500 parts of warm water, 104 parts of sodium bisulphite and 73 parts of 41% formaldehyde solution, the proportions of the reacting compounds being substantially equimolecular. The mixture is heated on the water bath until on cooling no precipitation of para-aminobenzenesulphonamide occurs, which shows that the reaction is complete. Heating for 1 to 2 hours, depending upon the temperature, is sufficient. The solution is filtered and then evaporated to dryness. The residue is extracted with alcohol, sucked on the Buchner funnel, and then washer with alcohol and dried. The product is sodium para-sulphonamidobenzeneaminomethylenesulfonate having a composition corresponding to the structural formula

If desired, a slight excess, say 10%, of the para-aminobenzenesulphonamide may be employed to insure complete reaction with the formaldehyde-type sodium bisulphite. Two hours' heating on the water bath will be sufficient to insure complete reaction. The excess of starting material will, of course, make it impossible to judge the completion of the reaction solely by the precipitation of para-aminobenzenesulphonamide on cooling the reaction solution, but the use of an excess of such compound has the advantage that it insures the complete binding of the formed formaldehyde sodium bisulphite. The excess para-aminobenzenesulphonamide can be readily removed with alcohol, the compound not being soluble in water, whereas formaldehyde sodium sulphite, like the desired end product, is soluble in water and unreacted salt could therefore be separated from the end product only with difficulty.

The potassium salt of para-sulphonamido-benzeneaminomethylenesulfonic acid is prepared in a manner similar to that of the sodium salt except that potassium formaldehyde bisulphite is used instead of the sodium salt. The ammonium salt is prepared by refluxing para-aminobenzenesulphonamide with formaldehyde ammonium bisulphite. This material is somewhat less soluble than the sodium salt and crystallizes from the aqueous reaction liquor. It can be purified by dissolving in boiling methyl alcohol, cooling, filtering, and evaporating the filtrate to dryness. The ammonium salt melts with decomposition around 175° C., uncorrected.

Example 2

180 parts of para-aminobenzenesulphonamide (which represents an excess of about 5%) and 150 parts of formaldehyde sodium bisulphite are refluxed for about two hours or longer with about 1500 parts of water. The reaction product is evaporated almost to dryness. Thereupon 2000 parts of absolute alcohol are added, the mixture boiled, and the insoluble residue filtered off. The residue is washed with alcohol and then dried. Analysis shows that the general formula of the compound, as in Example 1, is $C_7H_{11}O_6N_2S_2Na$, which corresponds to the structural formula

Example 3

150 parts of formaldehyde sodium bisulphite and 200 parts of para-aminobenzenesulphonmethylamide are refluxed with 1000 parts of water for about three hours. The resulting reaction liquid is evaporated almost to dryness, diluted with about 2000 parts of absolute alcohol filtered, subjected to suction on the filter, washed with acetone and then dried at about 80° C. or higher. The analysis of the product shows it to have the general formula $C_8H_{13}O_6N_2S_2Na$, which corresponds to the structural formula

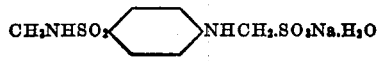

By starting with para-methylaminobenzenesulphonmethylamide, the corresponding end product is obtained.

The aminobenzenesulphonmethylamide may be prepared as follows: 10 gms. para-acetamidobenzenesulphonylchloride and 10 gms. methyl amine solution are reacted together with cooling. After standing for 4 hours the precipitate is sucked dry, and washed with alcohol and ether. The above acetamidobenzenesulphonmethylamide is hydrolyzed by refluxing for 2 hours with hydrochloric acid 1:1. On evaporating to dryness, taking up in water, exactly neutralizing with sodium carbonate, and filtering, the para-aminobenzenesulphonmethylamide is obtained. On crystallization from 20% alcohol it consists of pure white crystals melting at 109–110° C. The aminomethylenesulfonic acid sodium salt above described is purified by solution in absolute methyl alcohol, cooling, filtering, and evaporating off the methyl alcohol.

Example 4

11.7 gms. of para-acetaminobenzenesulphonylchloride are reacted with 5 gms. of piperidine and 2 gms. of sodium hydroxide in aqueous solution, the reaction flask being cooled with running water, the reaction being exothermic. After standing for some time the precipitate is sucked off and hydrolyzed by refluxing with 1:1 hydrochloric acid for ½ hour. The solution on evaporation to dryness and on re-solution in water, and neutralization, gives crystals of para-aminobenzenesulphonyl piperide, melting point 168° C. 2.4 gms. of the para-aminobenzenesulphonyl piperide and 1.4 gms. formaldehyde sodium bisulphite are then refluxed for 20 hours in 30 cc. of 30% alcohol. Higher temperatures may be employed in a sealed apparatus to prevent loss of solvent. On evaporation to dryness and extraction with absolute alcohol, the residue consists of para-sulphonyl piperido benzeneaminomethylenesulphonic acid sodium salt, a white powder very soluble in water. Purification is effected by solution in methyl alcohol, filtration, and evaporation. The composition of the product corresponds to the following structural formula:

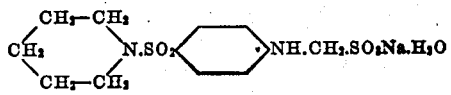

Example 5

11.7 gms. para-acetaminobenzenesulphonylchloride are reacted with 7.5 gms. of diethylamine, the reaction mixture being cooled with running water. The product so obtained is sucked dry and refluxed with 20 cc. of 1:1 hydrochloric acid for ½ hour and the solution evaporated to dryness. The residue on taking up in water and neutralizing with sodium carbonate solution gives pure crystals of para-aminobenzenesulphondiethylamide, melting point 103–4° C. 2 gms. of the para-aminobenzenesulphondiethylamide and 1.4 gms. formaldehyde sodium bisulphite are then refluxed for 20 hours in 30 cc. of 33% alcohol. On evaporation on a water bath a thick syrup forms, which on dilution with absolute alcohol causes no precipitation. The solution on evaporation is diluted with benzol and a sticky precipitate forms which hardens on rubbing. This is sucked off, washed with benzene and absolute ether and dried at 80° C. The para-sulphondiethylamidobenzeneaminomethylenesulfonic acid sodium salt consists of a white water soluble powder and analysis apparently shows it to conform to the following formula:

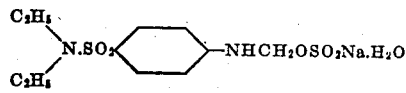

Example 6

11.7 gms. para-acetaminobenzenesulphonylchloride are reacted with 7.4 gms. isoamylamide, with cooling, and the product isolated, hydrolyzed, and worked up in the manner described in Examples Nos. 3, 4, and 5. The material, recrystallized from 50% alcohol, melts at 109–110° C. 2.4 gms. of the para-aminobenzenesulphonisoamylamide so obtained are dissolved in 10 cc. alcohol and mixed with a solution of 1.4 gms. formaldehyde sodium bisulphite in 20 cc. water. The homogeneous solution so formed is refluxed for 4 hours, evaporated to dryness, diluted with 20 cc. absolute alcohol, and re-evaporated, this operation being repeated until a crystal paste forms which is sucked off, washed with alcohol and then with ether, and dried at 80° C. The material is purified by dissolving in methyl alcohol, filtering, and evaporating to dryness. The material consists of a white water soluble powder with analysis corresponding to the following formula:

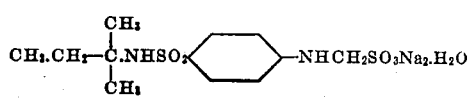

Example 7

17.3 gms. para-acetaminobenzenesulphonylchloride are reacted with 10 gms. 33% solution ethylamine and 2.96 gms. of sodium hydroxide. The acetaminobenzenesulphonethylamide so obtained is hydrolyzed and worked up in the manner described in Example No. 5. The para-amino-benzenesulphonethylamide is obtained in pure white crystals melting at 105–6° C. 1 gm. of this material and 0.7 gm. formaldehyde sodium bisulphite mixed with 10 cc. water forms a solution on heating, which, on refluxing for 3 hours, evaporating to dryness, and diluting with alcohol, and repeating this operation twice gives a white residue soluble in water, insoluble in ethyl alcohol, soluble in methyl alcohol, from which it can be purified and from analysis appears to have the following constitution:

Example 8

11.7 gms. para-acetaminobenzenesulphonylchloride and 5.7 gms. af allylamine are reacted together. After standing for 4 hours the product is isolated, then hydrolyzed and worked up as described in previous examples, and the product re-crystallized from 20% alcohol. The para-aminobenzenesulphonallylamide so obtained consisted of white crystals soluble in hot water and alcohol with a melting point of 104–104.5° C. 2.1 gms. para-aminobenzenesulphonallylamide and 1.4 gms. sodium formaldehyde bisulphite are then refluxed for 2½ hours with 20 cc. water. After evaporation to dryness and dilution with 50 cc. alcohol the white solid precipitate is sucked off, washed with alcohol, dissolved in hot methyl alcohol, cooled, filtered, and evaporated to dryness. The parasulphonallylamidobenzeneaminomethylenesulfonic acid sodium salt so formed shows on analysis the following constitution:

Example 9

11.7 gms. of para-acetaminobenzenesulphonylchloride are mixed with 20 cc. water and 6 gms. benzylamine added dropwise with cooling. To this solution 2 gms. of sodium hydroxide and 20 cc. water are added dropwise with cooling. After standing at room temperature for 3 hours the precipitate is sucked off, washed with water, and refluxed with 100 cc. 1:1 hydrochloric acid together with 20 cc. alcohol. On cooling the reaction product forms a crystalline paste of para-aminobenzenesulphonbenzylamide hydrochloride. This, on neutralization in the usual manner, gives a corresponding para-aminobenzenesulphonbenzylamide which on re-crystallization from 30% alcohol has a melting point of 119–120° C. (uncorrected). 2.6 gms. of the para-aminobenzenesulphonbenzylamide and 1.5 gms. formaldehyde sodium bisulphite are then refluxed in 45 cc. 25% alcohol for 20 hours. On cooling crystal formation occurs. The crystals are sucked off, washed with 25% alcohol and then with acetone, and the residue dried at 80° C. Crystals are pure white, melting at about 234° C. uncorrected with decomposition. The material is soluble to a limited extent in water, and on analysis shows the following apparent constitution:

The compounds may be administered intravenously, subcutaneously, intramuscularly, or orally. For intramuscular injection a 10% aqueous solution may be employed, or higher concentrations if desired; while for intravenous injection a 1–2% aqueous solution is suitable. The compounds may be administered orally in the form of a concentrated solution but preferably in the form of tablets. The dosage may amount to a total of 1 gram per diem, but in view of the non-toxic character of the substances, even larger dosages may be utilized. Tests have indicated that as much as 8 grams per diem can be used for an adult person without visible ill effects.

In place of the formaldehyde sodium bisulphite, other bisulphite compounds capable of combining with the para-aminobenzenesulphonamide compound may be employed, as I have found that desirable antiseptic properties as above described are common to the neutral compounds generally of the para-sulphonamidobenzeneaminomethanesulphonate group.

It will, of course, be understood that although I have generally indicated my new compounds as containing water of crystallization, my invention contemplates also the compounds freed of such water, and such anhydrous compounds are to be regarded as equivalents of the hydrated compounds defined in the claims.

Where hereinabove reference is made to a substituting hydrocarbon radical, it is to be understood that inorganically and organically substituted radicals such as hydroxyalkyl, for example, $\beta$-hydroxyethyl; halogenalkyl, for example, $\beta$-iodoethyl; aminoalkyl, for example, $\beta$-aminoethyl and alkoxyalkyl, for example, $\beta$-ethoxyethyl may be employed in place of purely hydrocarbon radicals, and wherein the claims hydrocarbon radicals are referred to, such substituted radicals are to be understood as being within the scope of the claims.

I claim:

1. A salt of para-sulphonyl piperido benzeneaminomethylenesulfonic acid.
2. The sodium salt of para-sulphonyl piperido benzeneaminomethylenesulfonic acid.
3. Alkali metal-methylene-sulphonate of para-aminobenzenesulphonpiperidide.

JOHN LEE.